UNITED STATES PATENT OFFICE.

JOHN C. BENTON, OF SANTA BARBARA, CAL., ASSIGNOR OF TWO-THIRDS HIS RIGHT TO JAMES A. BLOOD AND JAMES W. ORR, OF SAME PLACE.

IMPROVEMENT IN INSECTICIDES.

Specification forming part of Letters Patent No. 212,835, dated March 4, 1879; application filed August 19, 1878.

*To all whom it may concern:*

Be it known that I, JOHN C. BENTON, of the city and county of Santa Barbara, in the State of California, have invented a new and useful Poison for Animals; and I hereby declare the following to be a full, clear, and exact description thereof.

I pulverize thoroughly one ounce of strychnia; dissolve in two pounds of warm honey one-half ounce of cyanide of potash; macerate one and one-half pound of cheese with two gills of warm water. I then mix the above ingredients and thoroughly incorporate them, so as to form a thick pasty mass, which pour upon a gallon of wheat or other cereal, and thoroughly stir the mass so each grain will be coated with the paste; then place the compound on a flat surface and apply a quantity of flour or corn-meal, at the same time stirring or rolling the mass so each grain and its covering will separate and have an outer coating of the flour or meal. The granules are then to be dried and put up for use.

I am aware that the ingredients I use have been used separately, and therefore I do not claim them broadly.

Having thus described my invention, what I claim as new, and desire to secure by Letters Patent, is—

A new compound to be used as a poison for animals, consisting of wheat or other cereal coated with a mixture of strychnia, cyanide of potash, honey, cheese, and water.

In witness whereof I have hereunto subscribed my name, at said Santa Barbara city and county, State of California, this 23d of July, 1878.

JOHN CALVIN BENTON.

Witnesses:
E. B. HALL,
E. S. HALL.